United States Patent

Kadron et al.

[15] 3,704,423

[45] Nov. 28, 1972

[54] ADF WITH REMOTE DIGITAL TUNING

[72] Inventors: Stanley F. Kadron, Lighthouse Point; Gary L. Eisenhauser, Ft. Lauderdale; David J. Pryor, Ft. Lauderdale; Raul J. Chacon, Ft. Lauderdale, all of Fla.

[73] Assignee: The Bendix Corporation

[22] Filed: Nov. 23, 1970

[21] Appl. No.: 92,101

[52] U.S. Cl. ....................................................325/458

[51] Int. Cl. ....................................................H04b 1/16

[58] Field of Search ..........334/8, 11, 14, 16; 333/17; 318/668; 325/390, 458, 459, 464, 17, 25, 183, 184, 468

[56] References Cited

UNITED STATES PATENTS 3,487,311 12/1969 Luhowy ........................325/17
3,593,144 7/1971 Rentlinger et al. .........325/184
3,509,467 4/1970 Cole ..........................325/458
3,518,586 6/1970 Nilssen et al. ...............334/11
3,378,774 4/1968 Leypold.....................325/184

*Primary Examiner*—Robert L. Griffin
*Assistant Examiner*—Barry L. Leibowitz
*Attorney*—Plante, Hartz, Smith & Thompson, Bruce L. Lamb and William G. Christoforo

[57] ABSTRACT

A remotely controlled digitally tuned receiver for automatic direction finders wherein a decimal frequency selector switch provides digitally coded signals controlling the tuning of the receiver. The selector switch may be located at a distance from the receiver and connected thereto by wires carrying the coded decimal signal. Logic circuits within the receiver respond to the coded decimal signals to effect bandswitching and to control the frequency of a synthesizer serving as a local oscillator. The synthesizer includes a voltage controlled oscillator, the control voltage of which also controls the tuning of resonant circuits selected by the bandswitch.

18 Claims, 6 Drawing Figures

INVENTORS
STANLEY F. KADRON
GARY L. EISENHAUER
RAUL J. CHACON
DAVID J. PRYOR
BY [signature]
ATTORNEY INVENTORS
STANLEY F. KADRON
GARY L. EISENHAUER
RAUL J. CHACON
DAVID J. PRYOR
BY [signature]
ATTORNEY

INVENTORS
STANLEY F. KADRON
GARY L. EISENHAUER
RAUL J. CHACON
DAVID J. PRYOR

BY Bruce L. Lamb

ATTORNEY

INVENTORS
STANLEY F. KADRON
GARY L. EISENHAUER
RAUL J. CHACON
DAVID J. PRYOR
BY [signature]
ATTORNEY

INVENTORS
STANLEY F. KADRON
GARY L. EISENHAUER
RAUL J. CHACON
DAVID J. PRYOR

BY Bruce L. Lamb

ATTORNEY

INVENTORS
STANLEY F. KADRON
GARY L. EISENHAUER
RAUL J. CHACON
DAVID J. PRYOR
BY [signature]
ATTORNEY

ADF WITH REMOTE DIGITAL TUNING

The present invention relates to automatic direction finder systems. More particularly it relates to improvements in the tuning and frequency control of the radio receiver of an automatic direction finder system.

Automatic direction finder systems are well known navigational aids. Typically, these systems include a rotatable loop antenna, or the equivalent in the form of a fixed loop antenna combined with a goniometer, an omnidirectional sense antenna and a radio receiver which includes a servomechanism for positioning the loop antenna to indicate the relative bearing, without ambiguity, of a radio transmitting station.

Because of space limitations in aircraft, it is frequently necessary to provide a remote tuning control for the ADF receiver. Primitive remote controls consisted simply of a dial mechanism manually rotatable through the tuning range of the receiver coupled by a flexible shaft to the tuning elements of the receiver, i.e. variable capacitors or inductors. Direct mechanical couplings suffer many limitations, amongst which are inherent backlash and the relatively short distance through which motion can be transmitted. Manual remote tuning controls therefore gave way to electrical remote controls, of which U.S. Pat. No. 2,943,249 is an example.

Electrical remote controls provided almost complete freedom of choice in locating the receiver within the aircraft, with some restraints imposed by antenna locations and r.f. transmission line lengths. The electrical controls typified by the referenced patent, in common with mechanical controls, are basically devices for transmitting motion. It is well within the state of the art to construct an electrical remote control having a resolution equal to the most careful direct manual adjustment of a receiver tuning control, but because of detuning effects of temperature or environment the accuracy of the calibration of the tuning control is usually in doubt. Consequently, a necessary accessory to prior ADF receiver tuning controls, whether direct or remote, manual or electrical, is a fine tuning indicator either in the form of a meter or an audible zero-beat signal.

The necessity for making fine tuning adjustments in a minor inconvenience at all times and a major inconvenience whenever it is desired to take bearings in rapid succession on two different stations. In the latter case, even the elimination of the requirement for making fine tuning adjustments in a mechanically tuned receiver would not provide complete satisfaction, since the inertia of the system substantially slows the tuning operation.

It is therefore the principal object of the present invention to construct an ADF receiver which is tuned entirely electronically thereby reducing to insignificance the time required to tune any station within the operating band of the receiver.

It is a further object of the invention to construct an electronically tuned ADF receiver having a tuning accuracy and stability at least equal to the frequency standards of the transmitting stations, thereby eliminating any necessity for fine tuning adjustments.

It is still another object of the invention to provide an electronically tuned ADF receiver capable of being controlled remotely by digital selector switches, thereby simplifying and speeding the selection of the frequency to which the receiver is tuned and providing a positive indication of the selected frequency.

Briefly, the present invention comprises an ADF system in which the tuning of the superheterodyne receiver is accomplished within each band of the several frequency bands of operation by switching fixed capacitors and coils in the tuning circuits and by controlling by a single control voltage the capacity of a plurality of voltage variable capacitors, each of which is associated with one of the tuned circuits of the receiver, including that of the local oscillator. The receiver frequency is selected by setting a decimal digital switch which is wired to provide binary coded decimal switching signals to logic and control circuits for band selection and selection of fixed tuning elements within a band. More importantly, the logic controls a frequency comparator which tests the local oscillator frequency against a standard and, through feedback, establishes the correct control voltage necessary to adjust the voltage variable capacitors to the value required for precise tuning.

Figure 1:
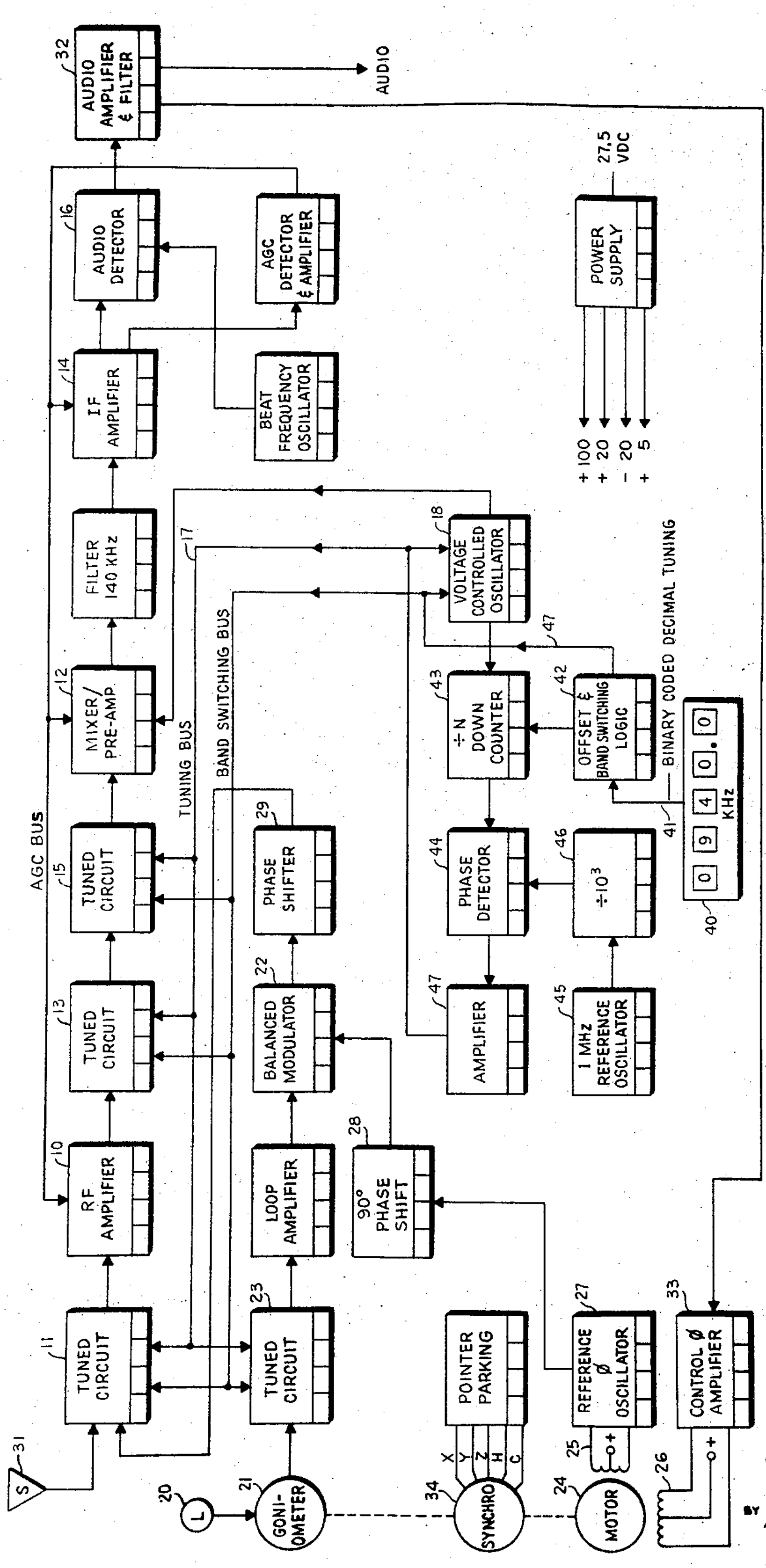
FIG. 1 is a functional block diagram of an ADF system incorporating the present invention.
Figure 3:
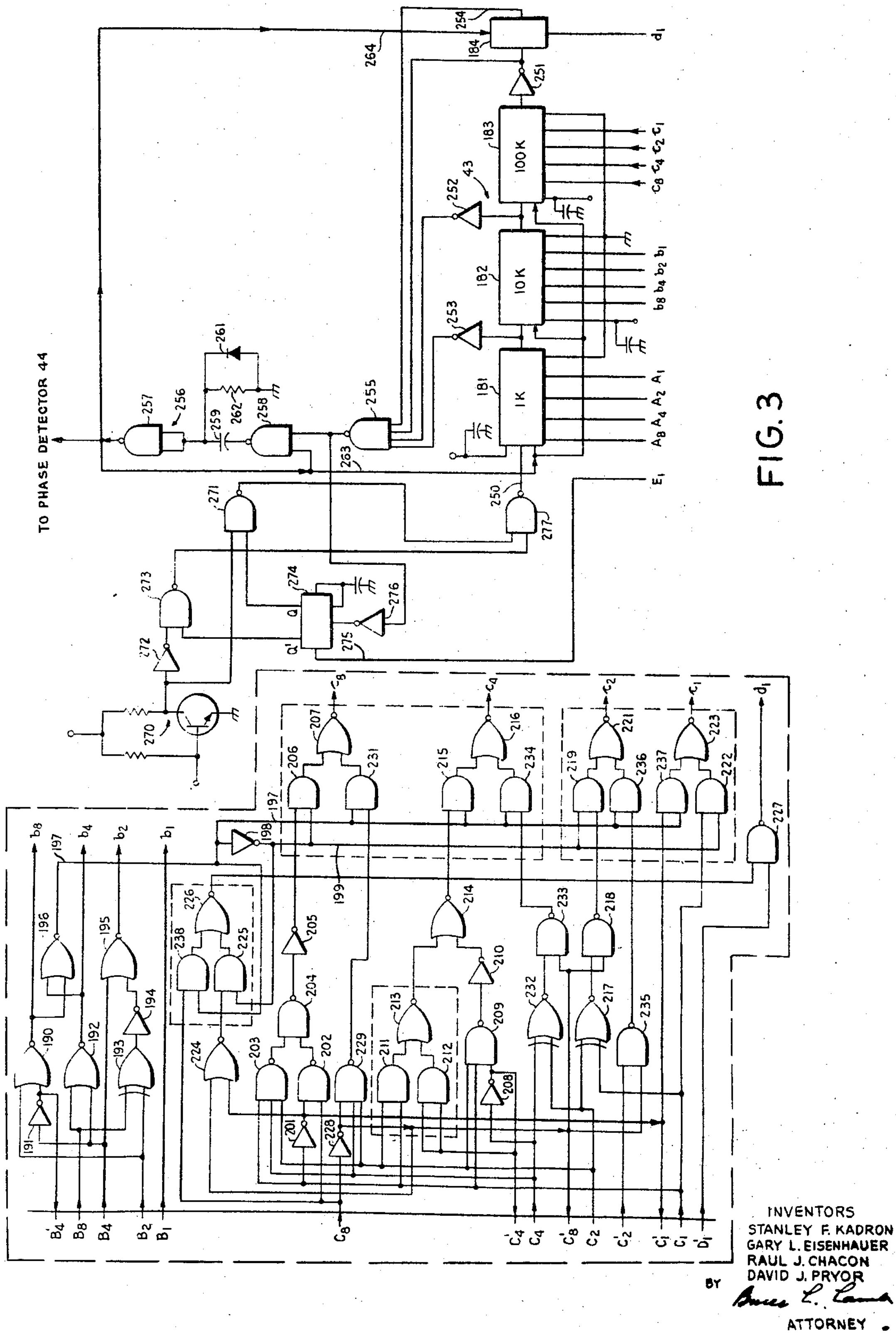
FIG. 3 is a combined logic and function block diagram illustrating the offset logic of element 42 and downcounter 13 of FIG. 1.
Figure 5:
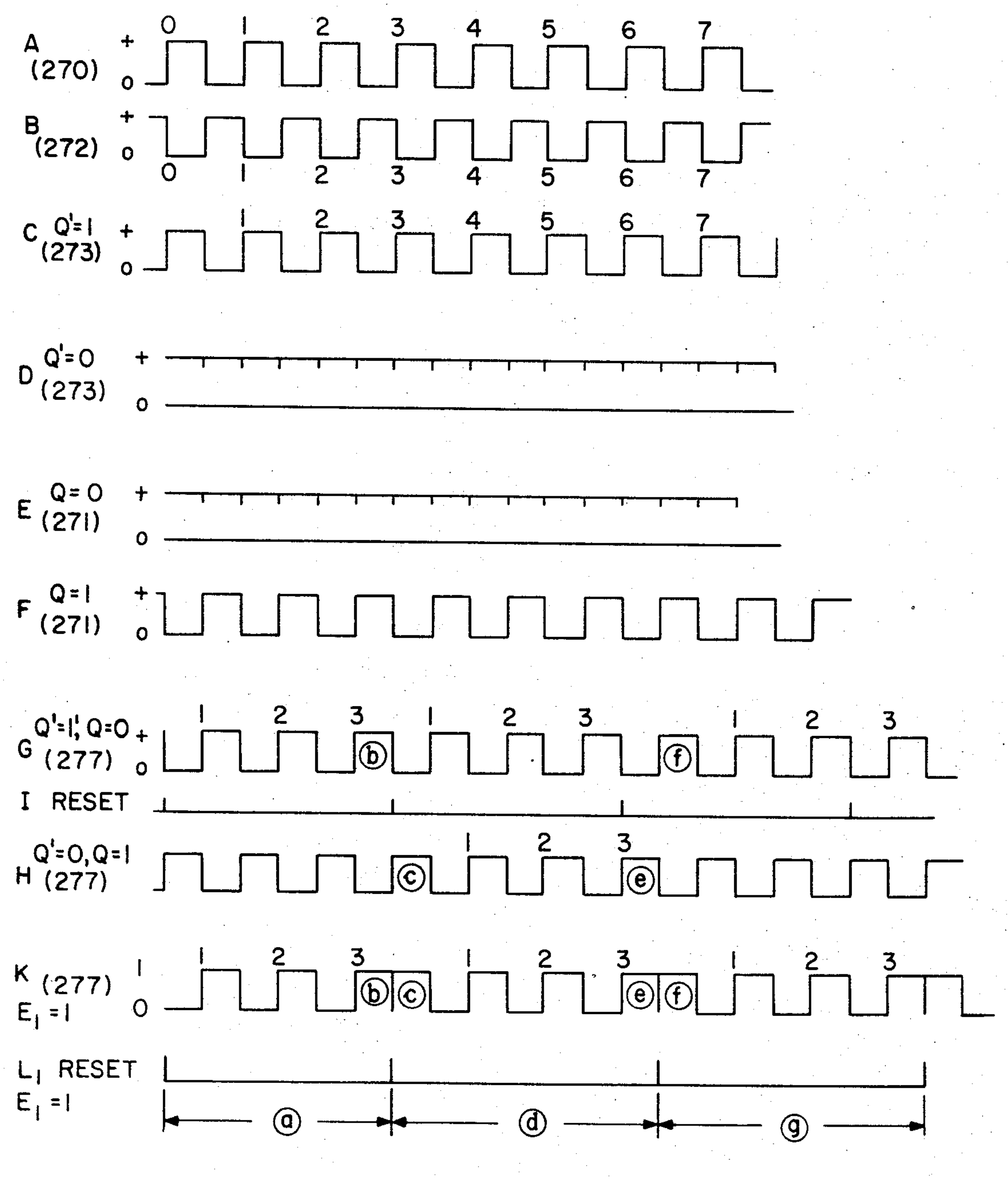
Figure 6:
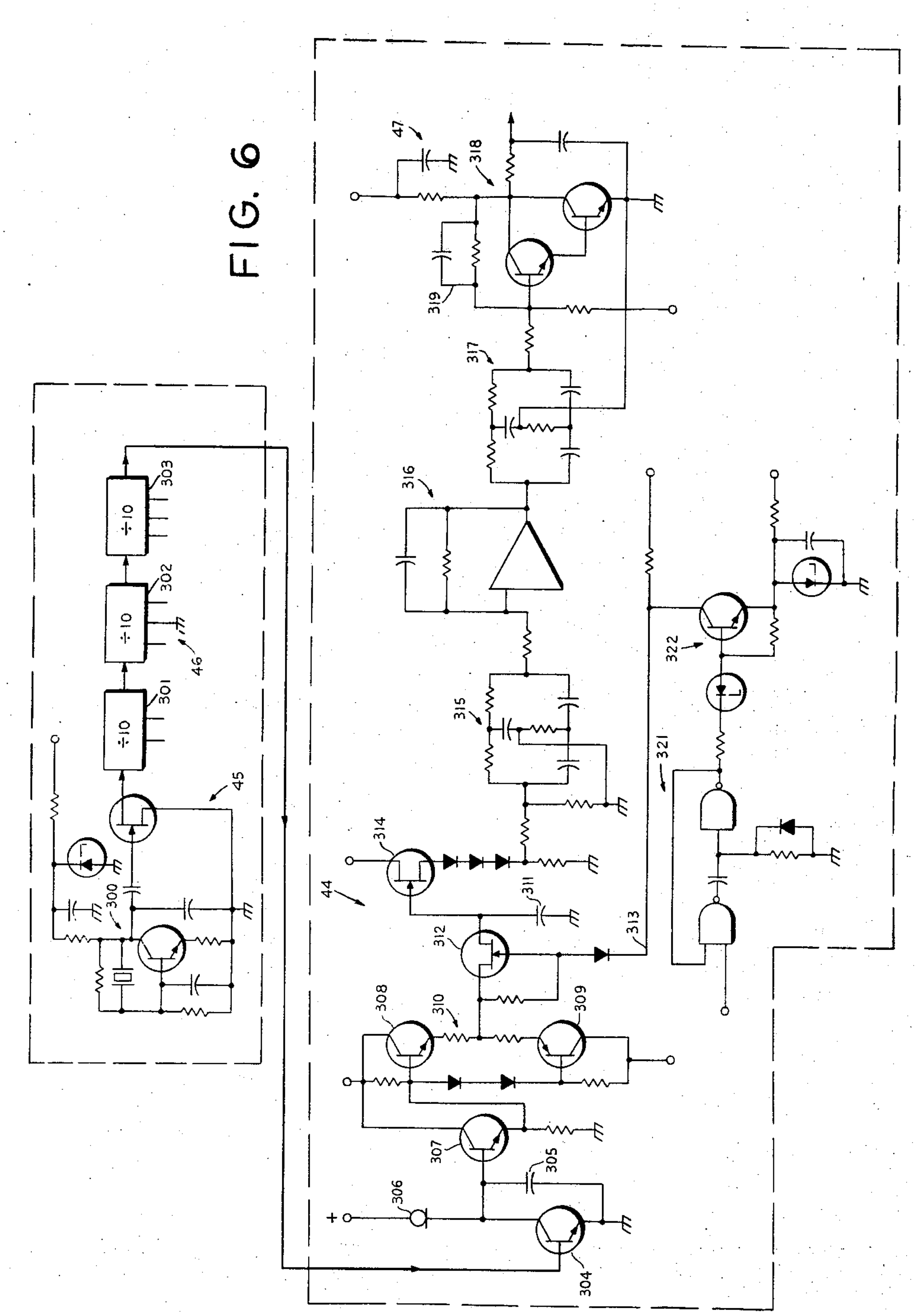

FIG. 5 is a waveform diagram helpful in understanding the operation of the 0.5KHz tuning means shown in FIG. 3; and FIG. 6 is a combined schematic and block diagram illustrating the reference oscillator 45 and a sample-and-hold type phase detector serving as the phase detector 44 of FIG. 1.

In the block diagram of FIG. 1 a number of elements commonly found in prior ADF systems will be recognized. The r.f. amplifier 10, mixer 12, i.f. amplifier 14, audio detector 16 and voltage controlled oscillator 18 comprise a superheterodyne receiver which differs from convention in that the voltage controlled oscillator 18 substitutes for the usual mechanically tuned local oscillator and in that the tuned circuits 11, 13, and 15 associated with the r.f. amplifier and the mixer are each electronically tuned by a common control voltage appearing on the tuning bus 17.

The loop antenna 20 and rotatable goniometer supplying an input signal to a balanced modulator 22 is also familiar except for the electronic tuning of the goniometer tuned circuit 23. The goniometer 21 is rotated to a position nulling signal from the loop by a servomotor 24 of the two-phase induction type including a reference field winding 25 and a control field winding 26. The reference field 25 is excited by a 110 Hz reference oscillator 27 which also drives the balanced modulator 22 through a quadrature phase shifting network 28. The modulated loop signal, corrected in phase by a phase shifter 29, is combined with the signal from an omnidirectional sense antenna 31 in tuned circuit 11. The combined signal is amplified and detected by the receiver to produce at the output of an audio amplifier and filter 32 a 110 Hz signal which either leads or lags the reference oscillator signal by 90°. This output is amplified in a control phase amplifier 33 and used to excite the control field winding 26 of servomotor 24. The amplitude of signal in winding 26 is dependent upon the displacement of goniometer 21 from a null position and the leading or lagging phase is dependent upon the direction of the goniometer displacement from the null. The servomotor 24 will therefore rotate goniometer 21 to a null position, the ambiguity of which is eliminated by the signal from sense antenna 31. The null position of goniometer 21 is indicative of the bearing of the transmitting station relative to loop 20. A synchro 34 transmits the position of goniometer 21 to a remote indicator (not shown) from which the transmitter bearing angle may be read. The principles of operation of an ADF system in providing bearing information have been only briefly described since they are well known and completely documented elsewhere.

The novelties of the present invention reside in the electronic, digitally controlled tuning system, the elements of which will first briefly be described with reference to FIG. 1, and subsequently be described in detail.

The receiver tuning is controlled by a digital frequency selector switch 40 containing three 10-position switches, one each for units, tens and hundreds KHz, and two two-position switches, one each for thousands KHz and 0.5 KHz. The selector switch is remotely located from the receiver and is manually settable to any number within the range of 190.0 –1749.5 KHz. The switch is wired to convert each of the decimal digits to binary coded decimal thus grounding selected wires of a group of four for each of the units, tens and hundreds KHz and either grounding, or not, a single wire each from the thousands and 0.5 KHz switches.

These wires are grouped in a cable 41 connected to the receiver offset and band switching logic circuits 42. It is necessary for the local oscillator of a superheterodyne receiver to operate either above or below the carrier frequency of the received signal by an amount equal to the intermediate frequency. In this instance an intermediate frequency of 140 KHz has been chosen so that the function of the offset logic is to add the binary coded decimal equivalent of 140 KHz to the frequency selected on switch 40. The offset selected frequency from logic 41 then controls the frequency of voltage controlled oscillator 18, in a manner now briefly described, to produce the required intermediate frequency.

The binary coded decimal output of logic 41 presents a downcounter 43 to the decimal value of the offset frequency in KHz. That is, if a frequency of 500 KHz is selected on switch 40, logic 42 will preset counter 43 to a condition requiring 640 input pulses from oscillator 18 to clear the counter and produce a counter reset pulse.

Reset pulses from counter 43 are supplied as one input to a phase detector 44. Another input to phase detector 44 is derived from a reference oscillator 45 operating at a frequency of 1 MHz which is divided by 1000 in divider 46 to produce pulses at the precise rate of 1 KHz. The phase detector 44 compares the time of occurrence of a pulse from divider 46 with the time of occurrence of a reset pulse from counter 43 and converts the time difference into a control voltage which is amplified (47) and fed back to oscillator 18 to control its frequency.

The control of oscillator 18 is best understood by an example. Again assuming that the selected frequency is 500 KHz, the offset frequency is 640 KHz and the down counter is set at 640. If oscillator 18 is operating at 640 KHz it will generate 640 cycles, or pulses, each millisecond and thus counter 43 will produce reset pulses at one millisecond intervals. When the period of the reset pulses is compared with the period of reference pulses in phase detector 44, no error results and the frequency of oscillator 18 is not changed.

If oscillator 18 were incorrectly operating at, say 650 KHz, counter 43 would produce reset pulses with a period of 640/650 ms. or approximately 0.984 ms. Reset pulses consequently lead the reference pulses by about 0.016 ms. and this difference appears as a change in the control voltage of such sense as to reduce the oscillator frequency.

On the other hand, if the oscillator were operating at less than the desired frequency, say at 630 KHz, reset pulses would be produced with a period of 640/630 ms. or approximately 1.016 ms. This would cause the reset pulse to lag the reference pulse by approximately 0.016 ms. and result in a control voltage changed in the opposite sense, causing the oscillator frequency to increase.

The frequency of oscillator 18 is determined by a tuned circuit which includes a voltage variable capacitor as the tuning element responsive to control voltage from amplifier 47. Tuned circuits 11, 13, 15 and 23 are similarly constructed and are tuned in tracking relationship by the control voltage from amplifier 47 applied through tuning bus 17 to the respective voltage variable capacitors. Since it is difficult to tune through the entire receiver range with the capacity change produced by variation of the control voltage from +4 to about +85v., it is desirable to divide the receiver tuning range into bands, and to switch a different coil or combination of coil and trimmer capacitor into each tuned circuit for each band. Tuning is further facilitated by dividing each band into segments, one of which is tuned by varying the variable capacitor from maximum to minimum, the second of which is tuned in the same manner except that a fixed capacitor is switched in parallel with the variable capacitor, and so on. Thus, tuning within a band will never initially be in error by more than the frequency difference of the end points of a segment. The variable frequency control means need then cover a smaller band of frequencies, enabling a more rapid and reliable lock-on to the desired frequency. Listed below are the frequency bands and segments thereof employed in this embodiment of the invention.

| Band | Frequency (KHz) | Segment (KHz) 1 | 2 | 3 |
|---|---|---|---|---|
| A | 190.0–399.5 | 190.0–219.5 | 220.0–269.5 | 270.9–399.5 |
| B | 400.0–839.5 | 400.0–469.5 | 470.9–579.5 | 580.0–839.5 |
| C | 840.0–1749.5 | 840.0–979.5 | 980.0-1199.5 | 1200.0–1749.5 |

Substitution of tuning elements of fixed value for frequency band and segment selection is controlled by the logic circuit 42, which recognizes a particular frequency set on switch 40 as being within a certain band and segment thereof and which produces switching signals on bus 47 for activating diode switches in the various tuned circuits to connect the appropriate coils and capacitors.

Figure 2:
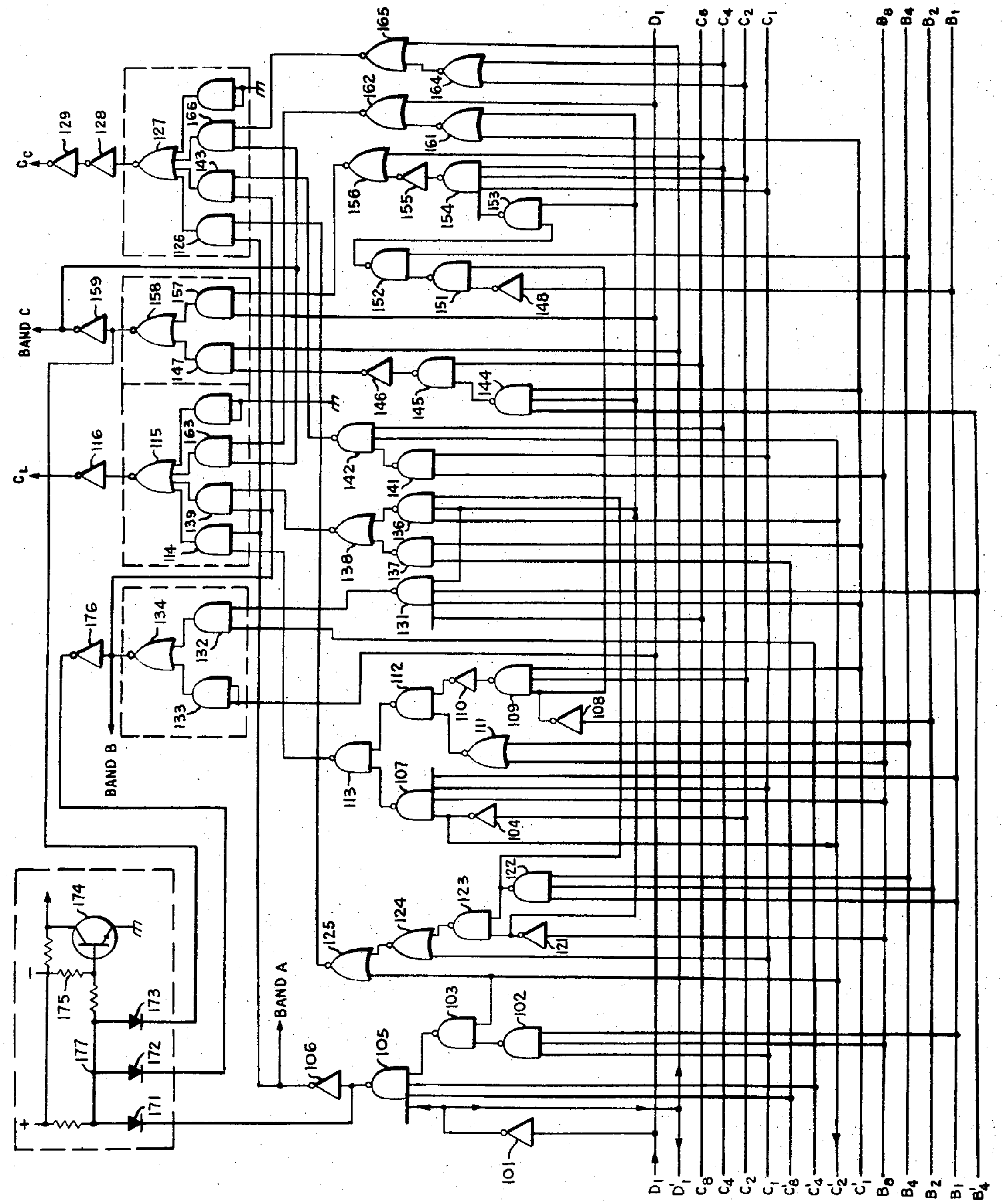
FIG. 2 is a logic diagram illustrating the band switching logic of element 42 of FIG. 1.
Figure 4:
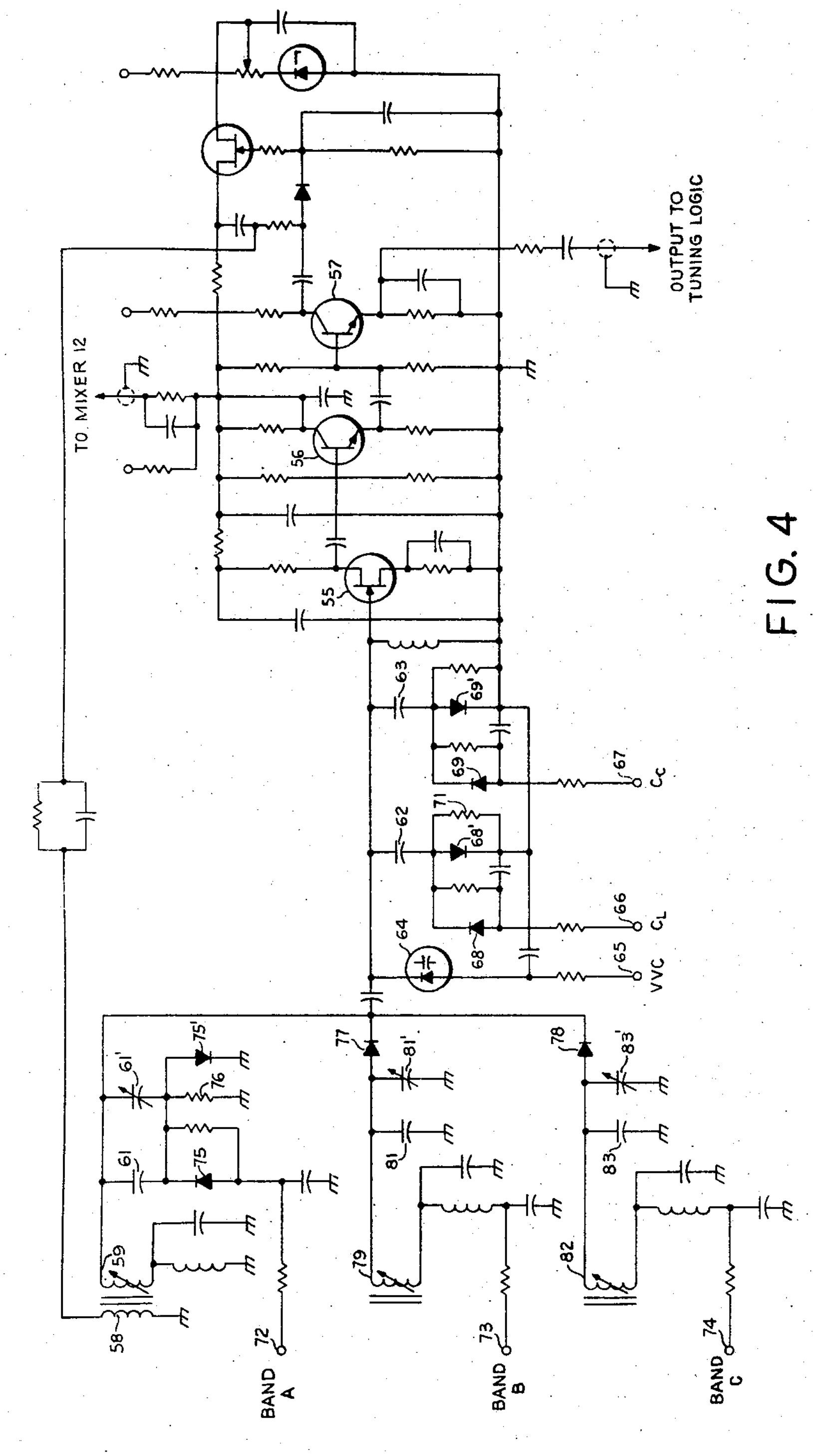
FIG. 4 is a schematic diagram of the voltage controlled oscillator 18 of FIG. 1.

Referring to FIGS. 2 and 4, and first briefly to FIG. 4 illustrating details of V CO 18. The oscillator is similar to the well known tuned grid type in which the input to a field effect transistor (FET) 55 constitutes a tuned circuit. FET 55 is followed by several buffer amplifiers 56, 57 the last of which provides feedback to a tickler coil 58, the whole of which operates in the usual manner. The frequency of oscillation (for Band A, Segment - 1) is determined by the resonant frequency of the tuned input circuit comprising coil 59 and parallel capacitors 61, trimmer 61', 62, 63 and voltage variable capacitor 64. The capacity of the latter element is controlled by the magnitude of the voltage on tuning bus 17 (FIG. 1) which is connected to terminal 65. Capacitors 62 and 63 are both in circuit for Segment 1, the low frequency segment of each of the bands, through positive bias voltages applied to lines $C_L$ (terminal 66) and $C_C$ (terminal 67). A positive voltage on these lines forward biases diodes 68, 68' and 69, 69' effectively connecting capacitors 62 and 63 in parallel with capacitor 64. Segment 2 of each of the bands is tuned by reversing the bias on line $C_L$, rendering diodes 68, 68' non-conductive whereupon the circuit through capacitor 62 is completed through a resistor 71 of such value as to represent an effectively open circuit. Similarly Segment 3 of each of the bands is tuned by reversing the bias on both lines $C_L$ and $C_C$, whereupon the frequency is dependent upon, for Band A, the resonance of coil 59 with capacitors 61, 61' and 64.

It has thus far been assumed that capacitors 61, 61' were in circuit with coil 59 but this will only be the case if a frequency within the band of 190.0–399.5 KHz is selected causing, by means shortly to be described, a positive voltage to be applied to terminal 72, while voltages at terminals 73 and 74 are at the "zero" level. A "one," or positive, level voltage at terminal 72 forward biases diodes 75, 75' effectively grounding the lower ends of capacitors 61, 61' and connecting them in parallel with coil 59. Removal of positive bias from these diodes causes the circuit through capacitors 61, 61' to be completed through high-valued resistor 76 representing an effectively open circuit.

Selection of a tuning frequency in the band of 400.0–839.5Hz (Band B), causes a "one" level voltage to be applied to terminal 73, while diodes 75, 75' and 78 are reverse biased. The resonant circuit which determines the oscillation frequency (assuming Segment 1) then comprises coil 59, coil 79, capacitors 81, 81', 62, 63 and 64, all in parallel. Shunting coil 59 with coil 79 reduces the total inductance to a value less than that of coil 79 alone and allows tuning through the higher frequency range of Band B with substantially the same values of capacity as are used to tune B and A. Similarly, selection of a frequency within the range of 840–1749.5 KHz (Band C) causes a "one" level voltage to appear on terminal 74 and "zero" level voltages to be applied to terminals 72 and 73, forward biasing diode 78 and reverse biasing diodes 75, 75' and 77. The resonant circuit for Band C, Segment 1 then comprises coils 59 and 82 and capacitors 83, 83', 62, 63 and 64, all in parallel. The control voltages necessary for coil and capacitor switching as described above are generated in the band switching logic illustrated in FIG. 2, to which reference is now made. Wires in the cable 41 connecting selector switch with the offset and band-switching logic 42 are identified according to the following convention:

| Tenths | Units | Tens | Hundreds | Thousands |
|---|---|---|---|---|
| 0.5 KHz – $E_1$ | 1 KHz – $A_1$ | 10 KHz – $B_1$ | 100 KHz – $C_1$ | 1000 KHz – $D_1$ |
| | 2 KHz – $A_2$ | 20 KHz – $B_2$ | 200 KHz – $C_2$ | |
| | 4 KHz – $A_4$ | 40 KHz – $B_4$ | 400 KHz – $C_4$ | |
| | 8 KHz – $A_8$ | 80 KHz – $B_8$ | 800 KHz – $C_8$ | |

Selector switch 40 performs the conversion of the selected frequency from the decimal to the binary coded decimal system by grounding an appropriate combination of wires in the cable. For example, if 500.0 KHz is selected, wires $C_4$ and $C_1$ are grounded and all other wires of the cable are open or connected to a positive voltage source. In the following description positive logic is assumed, unless otherwise specifically noted, wherein a logical "one" is represented by a positive voltage and a logical "zero" is represented by ground or a negative voltage.

Band Switching Logic

Band A has been defined as covering the frequency range of 190.0–399.5 KHz. The logic must recognize and yield a "one" level on the Band A line of bus 47 for any combination of wires resulting from selection of a frequency within this band. The following equation satisfies this condition:

$$\text{Band A} = \alpha = D_1'C_8'C_4'(C_1B_1B_8 + C_2) \quad \text{Eq. (1)}$$

The prime notation indicates that the complement is "true", i.e. "one". For example, if $D_1$ = "zero", $D_1'$= "one". Also, herein the + symbol indicates the logic "OR" operation and quantities written as products symbolize the "AND" operation. Equation (1) may be interpreted as stating that Band A is true ("one") if the number on the selector switch is not 1000 and not 800 and not 400 and is 190 or 200. The product $D_1'C_8'C_4'$ cannot be true unless the number selected is less than 400, otherwise $C_4'$becomes "zero". The product $C_1B_1B_8$ is true for any number in the range 190–199.5 since the values of units and tenths do not figure in this portion of the logic. Likewise $C_2$ is true for any number in the range 200.0–399.5, since numbers between 300.0–399.5 are formed by the combination $C_2C_1$. Therefore Equation (1) is "true" for selected frequencies of 190.0–399.5 KHz and none others within the total tuning range of 190.0–1749.5 KHz.

The complement $D_1'$of $D_1$ is provided by an inverter 101. A NAND gate 102 produces $(C_1B_1B_8)'$ at its output. NAND gate 103 combines $C_2'$, which is obtained from an inverter 104, with $(C_1B_1B_8)'$ to produce at its output $[(C_1B_1B_8)'C_2']'$. By de Morgan's theorem:

$$[(C_1B_1B_8)'C_2']' = (C_1B_1B_8 + C_2).$$

Thus there are present as inputs to NAND gate 105 the following: $D_1'$, $C_4'$and $C_8'$, both of which are obtained from inverters not shown in this figure, and $(C_1B_1B_8 + C_2)$ from gate 103. The output of gate 105 may be written as:

$$[D_1'C_4'C_8'(C_1B_1B_8+C_2)]'.$$

An inverter 106 complements gate 105 output to provide $$\{[D_1'C_4'C_8'(C_1B_1B_8+C_2)]'\}'$$

which equals $$D_1'C_4'C_8'(C_1B_1B_8+C_2),$$

the function $\alpha$ of Equation (1).

As described with reference to FIG. 4, tuning through each of the bands A, B and C is divided into three segments. In the low frequency segment, both control voltages $C_L$ and $C_C$ are positive, or "true", connecting capacitors 62 and 63 and similar fixed capacitors in other tuned circuits. In the mid-frequency segment, Segment 2, only control voltage $C_C$ is "true", causing capacitor 62 and similar capacitors controlled by $C_L$ to be disconnected. In the high frequency segment, Segment 3, neither $C_L$ nor $C_C$ is "true", thus disconnecting both capacitors 62 and 63 and other similarly controlled capacitors. The required functions can be written as:

$$C_L=\alpha_1+\beta_1+\gamma_1 \qquad \text{Eq. (2)}$$

$$C_C=\alpha_3'+\beta_3'+\gamma_3' \qquad \text{Eq. (3)}$$

where the subscripts refer to the logic functions further defining the band logic functions $\alpha, \beta, \gamma$.

Band A, Segment 1 covers the range of frequencies of 190–219.5 KHz. The logic function covering this band and segment can be written as:

$$\text{Band A, Segment } 1=\alpha_1=\alpha[C_1C_2'B_1B_8+C_2C_1'B_2'(B_4+B_8)'] \qquad \text{Eq. (4)}$$

Equation (4) will be understood as requiring that the selected frequency be within Band A and be 190 but not 200 or be 200 or 210 but not 220, 260 or 280, and, by implication, not 230, 240, 250 or 270. Equation (4) is solved as follows: NAND gate 107 receives as inputs $C_2'$, $B_8$, $C_1$ and $B_1$ and provides at its output $(C_2'B_8C_1B_1)'$. The complement of $B_2$ from an inverter 108 together with $C_2$ and $C_1'$ produce at the output of NAND gate 109 $(C_2C_1B_2')'$ which is complemented by inverter 110 to provide $(C_2C_1'B_2')$. $B_4$ and $B_8$ feeding NOR gate 111 produce at its output $(B_4+B_8)'$. Combining the outputs of gates 110 and 111 in NAND gate 112 provides $$[(C_2C_1'B_2')(B_4+B_8)']',$$

which together with the output of gate 107 yields from NAND gate 113

$$\{[(B_4+B_8)'C_2C_1'B_2']'(C_2'B_8C_1B_1)'\}',$$

which is equal to $$(C_2'B_8C_1B_1)+C_2C_1'B_2'(B_4+B_8)'.$$

The output of gate 113 together with that of inverter 106 are combined in AND gate 114 to provide $\alpha_1$, the solution of Equation (4). Whenever the selected frequency is within Segment 1 of B and A, $\alpha$, will be true and will pass through NOR gate 115 and inverter 116 to cause a positive control voltage to appear on line $C_L$.

By Equation (3), $C_C$ is "true" as long as the selected frequency is not in Segment 3 of any of the bands. The logic function for Band A, Segment 3 is $$\alpha_3=\alpha C_2[C_1+B_8+B_1B_2B_4] \qquad \text{Eq. (5)}$$

which may be interpreted as stating that the selected frequency is within Band A and is 300, 270, 280 or 290, thereby defining a segment extending from 270.9–399.5 KHz. Equation (4) is solved by the arrangement comprising inverter 121; NAND gates 122, 123; NOR gates 124 and 125; and AND gate 126. The outputs of these gates, in the order of their listing above, are:

$$B_8';(B_1B_2B_4)';[B_8'(B_1B_2B_4)']'=B_8+B_1B_2B_4;$$

$$(C_1+B_8+B_1B_2B_4)'=C_1'B_8'(B_1B_2B_4)';[C_2'+C_1'B_840(B_1B_a;B_4)']'=$$

$C_2[C_1+B_8B_1B_2B_4]$; and $\alpha C_2[C_1+B_8+B_1B_2B_4]$. The output of gate 126, the last of those just listed, is $\alpha_3$, the solution of Equation (5). The complement of $\alpha_3$ is obtained from NOR gate 127, and twice inverted by inverters 128 and 129 so that the control voltage on line $C_C$ remains $\alpha_3$'or, as will later be described, $\beta_3'$ or $\gamma_3'$. Therefore, $C_C$ will be "true" as long as the selected frequency is not within Segment 3 of Bands A, B or C, thus maintaining capacitor 63 and similarly controlled capacitors connected for frequencies selected in Segments 1 and 2 of Bands A, B and C.

In like manner, the logic function for Band B, $\beta$, is:

$$\beta=D_1'[C_4+C_8C_1'B_4'B_8'] \qquad \text{Eq. (6)}$$

which may be interpreted as stating that Band B is not 1000 and is 400 and, by implication, 500, 600 and 700 or is 800 but not 900 nor 840, 850, 860, 870 nor 880, thus defining the band as extending from 400.0 to 839.5 KHz. Equation (6) is solved in the circuit consisting of NAND gate 131; AND gates 132 and 133; and NOR gate 134. The outputs of these gates, in respective order are:

$$(C_8C_1'B_4'B_8')';C_4'(C_8C_1'B_4'B_8')';D_1;\text{and}$$

$$[D_1+C_4'(C_8C_1'B_4'B_8')']'=D_1'[C_4+(C_4+(C_8C_1'B_4'B_8')].$$

The last named output is the desired function $\beta$of Equation (6).

Segment 1 of Band B covers the range of 400.0–469.5 KHz. The logic function defining this segment is:

$$\beta_1=\beta C_8'C_1'C_2'B_8'(B_1B_2B_4)' \qquad \text{Eq. (7)}$$

which requires that the selected frequency be within Band B but excludes the numbers 800, 100, 200, 80 and 70. Thus the selected frequency must be at least 400 but cannot equal or exceed 470 in order to satisfy Equation (7). This equation is solved by NAND gates 136 and 137, NOR gate 138, and AND gate 139, together with output available from gate 122. Gate 122 output is $(B_1B_2B_4)'$. This quantity combined with $C_2'$an d $B_8'$in gate 136 produces at the output thereof $[C_2'B_8'(B_1B_2B_4)']'$ Output from gate 137 is $(C_8'C_1')'$. Combining outputs from gates 136 and 137 in gate 138 produces $$\{(C_8'C_1')'+[C_2'B_8'(B_1B_2B_4)']'\}'=C_8'C_1'C_2'B_8'(B_1B_2B_4)$$

The output of gate 138 is combined with $\beta$in gate 139 providing $$\beta C_8'C_1'C_2'B_8'(B_1B_2B_4)',$$

the solution of Equation (7) which will be "true" if the selected frequency is within Segment 1 of Band B thus causing a positive voltage, following the double inversion of gates 115 and 116, to appear on line $C_L$.

As in the case of Segment 2 of Band A, Segment 2 of Band B is tuned by enabling line C and disabling line $C_L$. By Equation (3) line $C_C$ will be enabled for frequencies not within Segment 3 of Band B. These frequencies are defined by the expression $$\beta[C_2'C_4(C_1B_8)']$$

which may be read as stating that the number is within Band B and is 400 but not 580, 590 nor 600, thus covering the range of 400–579.5. Therefore, $$\text{Segment 3, Band B} = \beta_3 = \beta[C_2'C_4(C_1B_8)']' \quad \text{Eq. (8)}$$

Equation (8) is solved in NAND gates 141 and 142 and AND gate 143. Gate 141 provides $(C_1B_8)'$, which combined with $C_2'$and $C_4$ in gate 142 produces $[C_2'C_4(C_4B_8)']'$. Combining this with $\beta$ from gate 134 in gate 143 yields $\beta_3$ which, triply inverted by gates 127, 128 and 129 causes $C_C$ to be "true" for all frequencies of Band B not within Segment 3.

Band C extends from 840–1749.5 KHz. The logical expression for this band can be written as:

$$\text{Band C} = \gamma = D_1'C_8(B_4'B_8'C_1')' + D_1\left\{C_8 + C_1C_2C_4[B_4(B_1'B_2')' + B_8]\right\}' \quad \text{Eq. (9)}$$

Equation (9) is written in a form best suited to a description of its solution by logic gates. Understanding of the fact that it defines the desired frequency band can best be obtained by expansion of Equation (9) to the following:

$$\gamma = D_1'C_8B_4(1) + D_1'C_8B_8(2) + D_1'C_8C_1(3) + D_1C_8'C_1'(4) + D_1C_8'C_2'(5) + D_1C_8'C_4'(6) + D_1C_8'B_4'B_8'(7) + D_1C_8'B_8'B_1'B_2'(8);$$

the numbers in parentheses are for convenience in the following: $\gamma$will be "true" if any one of the terms (1) through (8) of the above expression is "true". The numbers which will yield such true expressions are summarized below:

| (1) | (2) | (3) | (4) | (5) | (6) | (7) | (8) |
|---|---|---|---|---|---|---|---|
| 84(0) | 88(0) | 9(00) | 10(00) | 10(00) | 10(00) | 101(0) | 104(0) |
| 85(0) | 89(0) | | 12(00) | 11(00) | 11(00) | 102(0) | 114(0) |
| 86(0) | | | 14(00) | 14(00) | 12(00) | 103(0) | 124(0) |
| 87(0) | | | 16(00) | 15(00) | 13(00) | . | . |
| | | | | | | . | . |
| | | | | | | 171(0) | 174(0) |
| | | | | | | 172(0) | |
| | | | | | | 173(0) | |

The numbers enclosed in parentheses are not significant and may assume any value between 0–9 or 0–99 without causing the term with which they are associated to be "false". By inspection it is clear that $\gamma$is true for any number having a value 840.0–1749.5.

The first full term of Equation (9) is provided by NAND gates 144 and 145, inverter 146, and AND gate 147. The outputs of these gates in order, are:

$$(C_1'B_8'B_4')'; [C_8(C_1'B_8'B_4')']'; C_8(C_1'B_8'B_4')'; \text{and } D_1'C_8(C_1a;:B_8'B_4')'.$$

The second full term of Equation (9) is provided, in part, by inverter 148 and NAND gates 151, 152 and 153. $B_1'$from inverter 148, together with $B_2'$ appear from gate 151 as $(B_1'B_2')'$. Gate 152 provides $[B_4(B_1'B_2')']'$ which, together with $B_8'$ produces $$\left\{B_8'[B_4(B_1'B_2'))']'\right\}' = B_8 + [B_4(B_1'B_2')']$$

from gate 153. NAND gate 154, inverter 155, NOR gate 156 and AND gate 157 complete the solution of the second full term of Equation (9).

The output of gate 153, together with $C_1$, $C_2$and $C_4$ leave gate 154 as $$\left\{C_1C_2C_4(B_8 + [B_4(B_1'B_2')'])\right\}'.$$

Complemented in inverter 155 this becomes $$\left\{C_1C_2C_4(B_8 + [B_4(B_1'B_2')'])\right\}.$$

Gates 156 produces $C_8 + C_1C_3C_4\ (B_8[B_4(B_1'B_2')']\ '$. $D_1$ and the output of gate 156 completes the second term which is combined with the first term in NOR gate 158 and complemented in inverter 159 to yield $\gamma$of Equation (9).

Segment 1 of Band C covers the frequencies of 840.0–979.5 KHz. A logical expression for this function is:

$$\text{Segment 1, Band C} = \gamma_1 = \gamma D_1'(C_1' + B_8') \quad \text{Eq. (10)}$$

Equation (10) will be recognized as being "true" for all numbers in the range of 840.0–979.5 and "false" for any other number. NOR gates 161 and 162 and AND gate 163 provide the solution. The output of gate 161 is $(C_1' + B_8')'$, gate 162 produces $$[D_1 + (C_1' + B_8')']' = D_1'(C_1' + B_8'),$$

which combined with $\gamma$from inverter 159 in gate 163 and doubly inverted by gates 115 and 116 yield $\gamma_1$. Selection of a frequency within Segment 1 of Band C therefore causes line $C_L$ to be "true".

As in the other bands, line $C_C$ is "true" if the selected frequency is within Segment 1 or 2 but not Segment 3. Segment 3 of Band C extends from 1200–1749.5 KHz and is defined by the following:

$$\text{Segment 3, Band C} = \gamma_3 = \gamma D_1(C_2 + C_4) \quad \text{Eq. (11)}$$

Equation (11) is solved by NOR gates 164 and 165 and AND gate 166. The outputs of these gates are, respectively, $(C_2 + C_4)'$; $[D_1' + (C_2 + C_4)']'$; and $\gamma[D_1' + (C_2 + C_4)']' = \gamma D_1(C_2 + C_4) = \gamma_3$. Equation (3) requires $\gamma_3'$for control of line $C_C$ and this function follows from the triple inversion of gates 127, 128 and 129.

Needle Parking Logic

It is possible to set selector switch 40 at a number not within the operating band of the system. For example, the operator might inadvertently dial a number lower than 190.0 or higher than 1749.5. Such a happening can be detected by implementing the following expression:

$$\text{N.P.} = (\alpha + \beta + \gamma)' = \alpha'\beta'\gamma' \quad \text{Eq. (12)}$$

Equation (12) is implemented by diodes 171, 172 and 173 connected as an AND gate furnishing forward bias to a transistor 174 normally biased non-conductive by resistor 175 which is returned to a negative voltage source. The cathodes of diodes 171, 172 and 173 are respectively connected to gate 105, inverter 176 and gate 158 where $\alpha'$, $\beta'$ and $\gamma'$ are available. As long as any one of these functions are negative, which will be the case if any one of the complements of the functions is "true", the common point 177 of the anodes will be negative and no forward bias can flow to transistor 174. Should $\alpha$, $\beta$and $\gamma$all become negative, resulting from selection of a frequency not within Bands A, B or C, the cathodes of diodes 171, 172 and 173 all become positive, reverse biasing the diodes and allowing point 177 to assume a positive potential. Transistor 174 then conducts to perform the following functions: a needle parking relay (not shown) is actuated causing the needle of the ADF bearing indicator to assume a fixed position (usually 270°relative bearing will be indicated) thereby giving visual warning of the selection of an invalid frequency; the receiver is muted by shorting the AGC bus, giving aural warning of the selection of an invalid frequency; and the operation of the down counters is halted. The circuit connections for accomplishing these functions are not shown as they are of an obvious nature.

Offset Logic

As briefly noted previously it is necessary in a superheterodyne receiver to offset the oscillator frequency from the frequency of the station to be received by the amount of the intermediate frequency. The offset logic now described with reference to FIG. 3 adds 140.0 the number selected on switch 40 and utilizes the sum to preset the down counters 43. Down counters 43 comprise three cascaded decade counters 181, 182 and 183 and a flip-flop 184. The counters may be pre-set by binary coded decimal control to an equivalent decimal number. When the number of input pulses equals the preset number, the counter is cleared producing an output pulse. If the counter is not reset after the first output pulse, it will commence counting at zero and will require 10 additional input pulses before producing a second output pulse. The circuits of counters 181, etc. are now shown in detail herein since they are commercially available as integrated circuits.

Counter 181 is preset to the units KHz on selector switch 40 by wires $A_1$, $A_2$, and 4 and $A_8$ of cable 41. Counters 182 and 183 are preset to the sum of 140 plus the tens, hundreds and thousands number on selector switch 40. For example, if 500.0 KHz is selected, counter 182, the tens counter, is preset to 4 and counter 183, the hundreds counter is preset to 6. Control wires from switch 40 are not, therefore directly applicable to counters 182, 183 and 184 but must first be processed to comprehend the offset number. Such processing is the function of the offset logic.

Table I, below, is a truth table indicating the values of the control wires (upper case letters) from the tens selector switch for each decimal digit and the values of the control wires (lower case letters) after processing to include the offset. Tens TABLE I

TABLE I.—TENS

| Switch setting | $B_8$ | $B_4$ | $B_2$ | $B_1$ | | $b_8$ | $b_4$ | $b_2$ | $b_1$ | Carry |
|---|---|---|---|---|---|---|---|---|---|---|
| 0 | 0 | 0 | 0 | 0 | | 0 | 1 | 0 | 0 | 0 |
| 10 | 0 | 0 | 0 | 1 | | 0 | 1 | 0 | 1 | 0 |
| 20 | 0 | 0 | 1 | 0 | | 0 | 1 | 1 | 0 | 0 |
| 30 | 0 | 0 | 1 | 1 | | 0 | 1 | 1 | 1 | 0 |
| 40 | 0 | 1 | 0 | 0 | +40 | 1 | 0 | 0 | 0 | 0 |
| 50 | 0 | 1 | 0 | 1 | | 1 | 0 | 0 | 1 | 0 |
| 60 | 0 | 1 | 1 | 0 | | 0 | 0 | 0 | 0 | 1 |
| 70 | 0 | 1 | 1 | 1 | | 0 | 0 | 0 | 1 | 1 |
| 80 | 1 | 0 | 0 | 0 | | 0 | 0 | 1 | 0 | 1 |
| 90 | 1 | 0 | 0 | 1 | | 0 | 0 | 1 | 1 | 1 |

The following expressions can be determined by inspection of Table I:

$$b_8 = B_4 B_2' \qquad \text{Eq. (13)}$$

$$b_4 = (B_8 + B_4)' \qquad \text{Eq. (14)}$$

$$b_2 = B_4'(B_2 \oplus B_8) \qquad \text{Eq.(15)}$$

$$b_1 = B_1 \qquad \text{Eq. (16)}$$

$$\text{Carry} = b_8' b_4' \qquad \text{Eq. (b 17)}$$

The symbol⊕designates "exclusive or".

Because of the existence of a carry digit for values of 60–90 in Table I, Table II, below, states alternate values for the hundreds counter control. The middle column of values applies if there is no carry from tens. The right hand column applies is there is carry from tens.

TABLE II.—HUNDREDS

| | | | | | | No carry from tens | | | | | | With carry from tens | | | | |
|---|---|---|---|---|---|---|---|---|---|---|---|---|---|---|---|---|
| Switch setting | $C_8$ | $C_4$ | $C_2$ | $C_1$ | | $c_8$ | $c_4$ | $c_2$ | $c_1$ | carry | | $c_8$ | $c_4$ | $c_2$ | $c_1$ | Carry |
| 0 | 0 | 0 | 0 | 0 | | 0 | 0 | 0 | 1 | 0 | | 0 | 0 | 1 | 0 | 0 |
| 100 | 0 | 0 | 0 | 1 | | 0 | 0 | 1 | 0 | 0 | | 0 | 0 | 1 | 1 | 0 |
| 200 | 0 | 0 | 1 | 0 | | 0 | 0 | 1 | 1 | 0 | | 0 | 1 | 0 | 0 | 0 |
| 300 | 0 | 0 | 1 | 1 | | 0 | 1 | 0 | 0 | 0 | | 0 | 1 | 0 | 1 | 0 |
| 400 | 0 | 1 | 0 | 0 | +100 | 0 | 1 | 0 | 1 | 0 | or +200 | 0 | 1 | 1 | 0 | 0 |
| 500 | 0 | 1 | 0 | 1 | | 0 | 1 | 1 | 0 | 0 | | 0 | 1 | 1 | 1 | 0 |
| 600 | 0 | 1 | 1 | 0 | | 0 | 1 | 1 | 1 | 0 | | 1 | 0 | 0 | 0 | 0 |
| 700 | 0 | 1 | 1 | 1 | | 1 | 0 | 0 | 0 | 0 | | 1 | 0 | 0 | 1 | 0 |
| 800 | 1 | 0 | 0 | 0 | | 1 | 0 | 0 | 1 | 0 | | 0 | 0 | 0 | 0 | 1 |
| 900 | 1 | 0 | 0 | 1 | | 0 | 0 | 0 | 0 | 1 | | 0 | 0 | 0 | 1 | 1 |

The following expressions apply for no carry from tens:

$$c_8 = C_4 C_2 C_1 + C_8 C_1' \qquad \text{Eq. (18)}$$

$$c_4 = C_4(C_2' + C_1') + C_4 + C_2 C_1 \qquad \text{Eq. (19)}$$

$$c_2 = (C_2 \oplus C_1)\, C_8' \qquad \text{Eq. (20)}$$

$$c_1 = C_1' \qquad \text{Eq. (21)}$$

$$\text{Carry} = C_1 C_8 \qquad \text{Eq. (b 22)}$$

The following expressions apply for carry from tens:

$$c_8 = C_8'C_4C_2 \quad \text{Eq. (23)}$$

$$c_4 = (C_4 \oplus C_2)\, C_8' \quad \text{Eq. (b 24)}$$

$$c_2 = C_2'C_8' \quad \text{Eq. (25)}$$

$$c_1 = C_1 \quad \text{Eq. (26)}$$

$$\text{Carry} = C_8 \quad \text{Eq. (27)}$$

$$d_1 = D_1 + \text{Carry} \quad \text{Eq. (28)}$$

The validity of Equations (13) -(27) is readily proved by the truth tables. As simple examples note that columns $B_1$ and $b_1$ are identical in Table I, that the middle column $c_1$ is the complement and the right hand column $c_1$ is identical to column $C_1$ of Table II, thus proving Equations (16), (21) and (26).

As will be seen, alternate logic circuits are set up to solve Equations (18) - (22) as a group and Equations (23) - (27) as a group. Control of the counter by one or the other of the groups depends upon whether or not a carry is made from the tens logic.

Control wires from cable 41 appear at the left of FIG. 3. Equation (13) is solved by NOR gate 190 which receives $B_4'$from inverter 191 and $B_2$ as inputs and provides $(B_4'+B_2)' = B_4B_2'$as the output $b_8$ for presetting counter 182. Equation (14) is solved by NOR gate 192 which provides output $b_4 = (B_8 + B_4)'$from inputs $B_8$ and $B_4$. Equation (15) $b_2$ is solved by EXCLUSIVE OR gate 193, inverter 194 and NOR gate 195, which provide, respectively, $$B_2 \oplus B_8;\ (B_2 \oplus B_8)';\ \text{and}\ [(B_2 \oplus B_8)' + B_4]' = B_4'(B_2 \oplus B_8).$$

$b_1 = B_1$, hence $B_1$ is applied directly to counter 182. Equation (17) is solved by NOR gate 196 which combines $b_8$ from gate 190 with $b_4$ from gate 192 to yield $(b_8 + b_4)' = b_8'b_4'$. The output of gate 196 appears on "carry" line 197 which enables the logic for solving Equations (23) -(27). The output of gate 196 complemented by inverter 198 appears on "no carry" line 199 which enables the logic for solving Equations (18) -(22). The logic for solving Equation (18) is as follows: $C_1$ is complemented by an inverter 201; NAND gate 202 provides $(C_8C_1')'$; NAND gate 203 provides $(C_4C_2C_1)'$ Combining the outputs of gates 202 and 203 in NAND gate 204 yields $[(C_4C_2C_1)'(C_8C_1')']'$ which is $(C_4C_{2a}C_1)'(C_8C_1')'$ after inverter 205. The output of inverter 205 will pass through AND gate 206, if that gate is enabled by "no carry" line 199, to appear at the output of NOR gate 207 as $$[(C_4C_2C_1)'(C_8C_1')']' = (C_4C_2C_1) + (C_8C_1') = c_8$$

to preset counter 183.

Equation (19) is solved as follows: $C_4'$from inverter 208, together with $C_1$ and $C_2$ appear at the output of gate 209 as $(C_4'C_1C_2)'$which is complemented in inverter 210; AND gate 211 provides $C_1C_2$; AND gate 212 serves as a buffer supplying $C_4'$to NOR gate 213 which also receives the output of gate 211. The outputs of inverter 210 and gate 213 are $(C_4'C_1C_2)$ and $(C_2C_1 + C_4')'$. Combined in NOR gate 214 these become $[(C_4'C_1C_2) + (C_2C_1 + C_4')']'$. The output of gate 214 transmitted through AND gate 215 and NOR gate 216, if gate 215 is enabled by "no carry" line 199, becomes $C_4'C_1C_2 + (C_2C_1 + C_4')' = C_4'C_1C_2 + C_4(C_2C_1)' = C_4'C_1C_2 + C_4(C_2' = C_1')$ which is $c_4$.

EXCLUSIVE OR gate 217, AND gate 218, and NOR gate 221 provide $c_2$ of Equation (20) by producing, in order, $(C_2 \oplus C_1)$; $[(C_2 \oplus C_1)\, C_8']'$; and $(C_2 \oplus C_1)C_8' = c_2$. $c_2$ will appear from this source only if AND gate 219 is enabled by "no carry" line 199. It is only necessary to control transmission of $C_1'$ by AND gate 222, enabled by "no carry" line 199 and to invert the same by NOR gate 223 to provide $c_1$ of Equation (21).

The carry function, Equation (22), is provided by NOR gates 224 and 226 and "no carry" AND gate 225. Assuming the latter to be enabled, the outputs of gates 224 and 226, are, respectively, $(C_1' + C_8')'$ and $(C_1' + C_8')$. The output of gate 226 combined with $D_1'$ in NAND gate 227 furnishes $$[D_1'(C_1' + C_8')]' = D_1 + C_1C_8 = d_1 \quad \text{Eq. (28)}$$

for presetting the thousands counter, flip-flop 184.

Equations (23) -(27) apply if a "carry" is generated by the tens logic. The circuits for solving these equations will now be described.

$C_8'$ from inverter 228 together with $C_4$ and $C_2$ are combined in NAND gate 229 for $(C_8'C_4C_2)'$. This output will pass through gate 207 if AND gate 231 is enabled by "carry" line 197 as $C_8'C_4C_2 = c_8$. EXCLUSIVE OR gate 232 furnishes $(C_4 + C_2)$. This, together with $C_8'$ yields $[(C_4 \oplus C_2)C_8']'$ from NAND gate 233 which will appear at gate 216 as $(C_4 \oplus C_2)\, C_8' = c_4$ of Equation (24) if the "carry" AND gate 234 is enabled. NAND gate 235 receives $C_2'$ and $C_8'$ to provide $(C_2'C_8')$ which will appear from gate 221 as $C_2'C_8' = c_2$ of Equation 25, if the "carry" AND gate 236 is enabled by "carry" line 197. AND gate 237, if enabled by the "carry" line transmits $C_1'$ to gate 223 whence it will appear as $C_1 = C_1$ of Equation (26). $C_8$ passes through "carry" AND gate 238, if it is enabled, and gate 226, where it is complemented, to gate 227 as $C_8'$. The output of gate 227 then is $(D_1'C_8')' = D_1 + C_8 = d_1$.

Down Counter Operation and 0.5 KHz Tuning

Clock input to down counter 43 is on line 250. V CO 18 (FIG. 1) is the source of clock pulses. If the first clock pulse be regarded as zero, additional clock pulses equaling the number preset by control lines $A_1$ -$A_8$ are required to clear counter 181 and transfer a pulse to counter 182, marking the zero, or starting point of count by the latter. Thereafter, ten clock pulses are required on line 250 to advance counter 182 one count. When counter has been accumulated by counter 182 equaling the number preset by control lines $b_1$ -$b_8$, a pulse is transferred to the clock input of counter 183 marking the starting point of count for that unit. One hundred clock pulses are then required on line 250 to advance counter 183 one count. When count has been accumulated by counter 183 equaling the number preset by control lines $c_1$ -$c_8$ a positive or "one" level appears at the input to inverter 251. When count equaling the number preset in counters 181, 182 and 183 has been accumulated, the inputs to inverters 251, 252 and 253 are positive, or at the "one" level. If flip-flop 184 has not been preset by control $d_1$ to the "one" level, a "zero" or negative appears at its output, enabling NAND gate 255 which will invert and pass the simultaneous negative outputs of inverters 251, 252 and 253 as a positive pulse to pulse stretcher 256. If flip-flop 184 is preset by control $d_1$ so that a "one" or positive level appears on output 254, counter 43 must accumulate an additional count of 1000 before gate 255 is enabled.

Pulse stretcher 256 includes NAND gates 257 and 258. Constant level output of gate 258 is blocked by capacitor 259 so that input to gate 257 is zero, under those conditions, producing a positive output from the latter which is fed back to enable gate 258 for a positive input. When a positive pulse appears from gate 255 it will be transmitted by gate 258 to negatively charge capacitor 259. Capacitor 259 charges rapidly negative because diode 261 is forward biased to that polarity. The discharge path of capacitor 259 however is though resistor 262 which lengthens the time constant and maintains input to gate 257 after the disappearance of the initiating pulse from gate 255. The stretched output of gate 257 appears on lines 263 and 264 where it is used to reset counter 43 and flip-flop 184 to the preset numbers.

Clock pulses for counter 43 are derived from the output of V CO 18 (FIG. 1) and processed by the 0.5 KHz tuning logic prior to their appearance on line 250. This processing is best explained with the waveform diagrams of FIG. 5 which relate to the following circuits: The output of V CO 18 is shaped in a squaring circuit 270 whence output is applied directly as one input to NAND gate 271 and to an inverter 272. Inverter 272 supplies one input to NAND gate 273. A J-K flip-flop 274 supplies complementary outputs Q and Q′ to gates 271 and 273. The input on line 275 to the J gate of flip-flop 274 is from the 0.5 KHz line $E_1$ of selector switch 40. The clock input to flip-flop 274 is the counter reset pulse from gate 255 complemented by an inverter 276. If the 0.5 KHz selector switch is operated, placing a "one" or positive level on line 275, flip-flop 274 will complement or change state with each clock pulse from inverter 276, thus alternately enabling gates 271 and 273 and, as will be shown, effectively increasing the clock pulses applied through NAND gate 277 to line 250 by one-half count.

Referring to FIG. 5, the output of squaring circuit 270 appears as waveform A. The output of inverter 272 is shown as waveform B. Assuming the Q′ output of flip-flop 274 is "one" or positive, gate 273 will conduct on positive half cycles of waveform B and invert the same to produce waveform C. If the Q′ output of flip-flop 274 is "zero" or negative, gate 273 will not conduct during either the positive or negative half cycles of waveform B but will remain at a constant positive level as in waveform D. At the time Q′= 1, Q must equal "-zero" so that neither positive nor negative half cycles of waveform A will be conducted by gate 271 and the output of that gate will remain at a constant positive level as in waveform E. When Q′= 0 and Q = 1 gate 271 will conduct on positive half cycles of waveform A to produce the inverse thereof as shown in waveform F.

When Q = 0, the constant positive output from gate 271 will enable gate 277 for conduction of positive half cycles of waveform C from gate 273, producing the inverse thereof, waveform G.

When Q = 1, the constant positive output of gate 273 will enable gate 277 for conduction of positive half cycles of waveform F from gate 271, producing the inverse thereof, waveform H. If control line $E_1$ is "zero", waveform H is the clock input on line 250 to down counter 43. Assuming for simplicity of illustration that the down counter is preset to the count of "3", commencing at an arbitrary positive pulse of waveform G as zero, a reset pulse, waveform I, will be generated for each three full cycles of waveform G. The counter is arranged to set, i.e. advance, on the leading edge of clock pulses and to reset on the trailing edge thereof.

If $E_1$ = 1, i.e. 0.5 KHz is selected, thereby enabling the J input of flip-flop 274, each reset pulse causes the flip-flop to complement. Assuming the flip-flop is in the state Q = 0; Q′= ′ so that gate 277 output is waveform G and during the interval ⓐ= $E_1$ becomes "1"; the reset pulse occurring at the end of interval ⓐ will cause the flip-flop to change state to Q = 1; Q′ = 0. The output of gate 277 then becomes waveform H so that the "one" level of half cycle ⓑ, waveform G, continues with the "one" level of half cycle ⓒ of waveform H. The counter will not then commence counting until the next positive half cycle of waveform H, which is delayed by one-half the clock period from what would have occurred had the output of gate 277 continued as waveform G. At the end of interval ⓓ the trailing edge of half cycle ⓔ of waveform H causes the counter to reset, changing the state of flip-flop 274 to Q = 0; Q′ = 1; and causing the output of gate 277 to continue with the "one" level half cycle ⓕ of waveform G. The reset interval ⓖ succeeding interval ⓓ will also be 3 ½ clock periods in length as will all additional intervals as long as $E_1$ = 1.

In practice, counter 43 will be preset to a number between 190 and 1749. The principle of operation, however, remains exactly the same as in the simple example above as it is only necessary to lengthen the interval between reset pulses by one-half the clock period, whatever the counter preset, to achieve 0.5 KHz tuning.

Reference Oscillator, Sample and Hold Phase Detector

FIG. 6 illustrates the reference oscillator 45, divider 46 and phase detector 44 of FIG. 1. The reference oscillator comprises a crystal controlled transistor oscillator 300 of conventional design operating at a frequency of 1 MHz. The output of oscillator 300 is thrice divided by decade counters 301, 302 and 303 to reduce the frequency thereof by 1000. The reference signal comprising sharp pulses at a precise 1 KHz rate is applied to the base of transistor 304 to trigger the latter into conduction. Upon conduction of transistor 304 a capacitor 305 is discharged. Capacitor 305 normally charges from a constant current diode 306 connected to a positive voltage source. The voltage appearing at the base of transistor 307 is therefore of a highly linear sawtooth waveform having a precise repetition rate of 1 KHz.

Transistor 307 and transistors 308 and 309 are connected as a high input, low output impedance amplifier 310 which serves to charge a sampling capacitor 311 through a field effect transistor switch 312. Transistor 312 is normally non-conductive but on the appearance of a trigger pulse on line 313 it will become conductive for the duration of the pulse to transfer to capacitor 311 a voltage equal to the value of the sawtooth output of amplifier 310 at the instant of the appearance of the trigger pulse. The voltage on sampling capacitor 311 is amplified by a field effect transistor 314, filtered by a twin T type filter 315 to eliminate 1 KHz ripple and further amplified in an operational type amplifier 316. The output of amplifier 316 is filtered to reject harmonics of 2 KHz in twin T filter 317 and applied to an impedance matching amplifier 318 which includes a feedback network 319 for attenuating signals above 1 KHz in frequency. Amplifier 318 constitutes amplifier 47 of FIG. 1, the output of which, as earlier described, controls the frequency of oscillator 18 together with the tuning of circuits 11, 13, etc.

Trigger pulses on line 313 are derived from the reset pulses of counter 43 by passing the same through a pulse stretcher 321 and amplifier 322. In a stable condition, pulses on line 313 will occur precisely at the same point on the slope of the sawtooth wave from amplifier 310 resulting in a constant voltage on capacitor 311. Should oscillator 18 drift from the required frequency, pulses on line 313 will occur at a time corresponding to a lower or a higher point on the sawtooth slope, depending on the direction of frequency drift. The voltage on capacitor 311 will then change correspondingly to correct the frequency of the oscillator. It will be appreciated that the sample and hold circuit comprised by elements 304– 312 is but one form of phase detector which may be successfully employed to develop a control voltage.

The invention claimed is:

1. A remotely controlled digitally tuned superheterodyne receiver capable of covering a wide frequency range comprising;
   - a manual switch settable to the decimal indication of a selected frequency and providing a digitally coded output signal equivalent to the decimal setting thereof;
   - a plurality of electrically reactive elements having parameters variable by means of a control voltage applied thereto;
   - a plurality of electrically reactive elements having fixed parameters;
   - diode band switching means for combining, in accordance with a first bias voltage applied to said diode means, said fixed parameter elements with said variable parameter elements to provide a plurality of resonant circuits each which may be tuned through a particular band of frequencies within the frequency range of the receiver by variation of the control of said variable parameter elements;
   - first logic means for recognizing an output signal of said manual switch as corresponding to a frequency within a particular band and providing a bias voltage for said diode means to cause said diode means to combine resonant circuits tunable within said particular band;
   - a local oscillator having a variable frequency output;
   - a standard oscillator having a fixed frequency output;
   - second logic means responsive to the output signal of said manual switch for dividing the frequency of the output of said local oscillator by a number having a constant relationship to the selected frequency of said switch;
   - means for comparing the frequency of the output of said local oscillator with that of said standard oscillator to develop a feedback voltage for controlling the frequency of said local oscillator so that the divided value thereof equals the frequency of said standard oscillator; and
   - means applying said feedback voltage as the control voltage for said variable parameter elements for tuning said resonant circuits, one of which constitutes the means determining the frequency of said local oscillator output.

2. A receiver as claimed in claim 1 with additionally
   - a second plurality of fixed parameter reactive elements;
   - second diode switch means for connecting, in accordance a second bias voltage applied thereto, at least one each of said second fixed reactive elements to resonate with and partially determine the frequency of the circuits connected by said diode band switching means and
   - third logic means controlling said second switching means for recognizing a segment of frequencies within each band of frequencies and for providing said second bias voltage whereby said second elements are connected in circuit for tuning a segment of frequencies in each band of frequencies.

3. A receiver as claimed in claim 1 wherein said first logic means are connected to solve logic equations defining a logically true condition for a first range of digitally coded output signals from said manual switch and thereby control said band switching means so that said fixed parameter elements are connected in resonant circuits tunable through frequencies corresponding to said first range of digitally coded output signals and wherein said first logic means solve different logic equations defining a logically true condition for another range of digitally coded output signals thereby controlling said band switching means so that said fixed parameter elements are connected in resonant circuits tunable through frequencies corresponding to said other range of digitally coded output signals.

4. A receiver as claimed in claim 1 wherein said second logic means includes a digital counter presettable to said number having a constant relationship to said selected frequency, said counter receiving said local oscillator output and generating an output pulse upon counting a sum of signal cycles of said local oscillator equal to said number, said counter output pulse being compared with the output of said standard oscillator to develop said feedback voltage.

5. A receiver as claimed in claim 4 wherein said counter output pulse is connected to reset said counter to said number.

6. A receiver as claimed in claim 4 wherein said counter responds to one phase of output from said local oscillator and with additionally means interposed between said local oscillator and said counter for selectively inverting the phase of said local oscillator output.

7. A receiver as claimed in claim 6 wherein said means for selectively inverting phase includes means responsive to said counter output pulse whereby said phase inverter means inverts the phase of said local oscillator output during alternate periods of output pulses from said counter.

8. A remotely controlled digitally tuned superheterodyne receiver said receiver being at one location and including there a mixer and a local oscillator for converting the frequency of received signals to a constant intermediate frequency, comprising:
   - a manual selector switch located remotely from said receiver, said switch being settable to a decimal number indicating the frequency to be tuned by said receiver and providing an electrical digitally coded output signal equivalent to said number;

electrical conductors for transmitting said digitally coded output signal from said switch to said receiver;

a plurality of resonant circuits in said receiver each of which includes an element having a reactance variable by means of an applied control voltage for tuning through a particular band of frequencies within the tuning rang e of said receiver;

diode band switching means in said receiver for connecting in operation particular ones of said resonant circuits in accordance with a bias voltage applied thereto;

logic means in said receiver responsive to the coded output of said manual switch to provide bias voltage for said diode band switching means; and a frequency synthesizer serving as the local oscillator for said receiver, said synthesizer including logic means responsive to the coded output of said manual switch for controlling the frequency of the output of said synthesizer at a value offset from the frequency set on said manual switch by an amount equal to the intermediate frequency of the receiver, said synthesizer also providing a voltage output for controlling said variable reactance elements of said resonant circuits.

9. A receiver as claimed in claim 8 wherein said synthesizer includes a constant frequency oscillator;

a voltage controlled variable frequency oscillator;

a counter for counting output cycles of said variable frequency oscillator, said counter being preset by said synthesizer logic means to a number equalling the desired synthesizer output frequency divided by the frequency of said constant frequency oscillator and providing an output signal upon the accumulation of a sum of said variable frequency oscillator cycles equal to said preset number; and means for controlling the frequency of said variable frequency oscillator, said frequency control means including means for comparing the phase of output from said constant frequency oscillator with the phase of output from said counter to develop an oscillator control voltage, said oscillator control voltage also serving to tune said resonant circuits.

10. A receiver as claimed in claim 9 wherein said variable frequency oscillator produces a bipolar output signal, said counter responding to a particular polarity of said variable frequency oscillator output, and with additionally:

means for selectively reversing the phase of the output of said variable oscillator.

11. A receiver as claimed in claim 10 wherein said phase reversing means includes means controlled by said coded output from said manual switch for enabling said phase reversing means.

12. A receiver as claimed in claim 11, with additionally:

means responsive to said counter output for causing said phase reversing means to reverse the phase of said variable frequency oscillator output during alternate periods of output from said counter.

13. A receiver as claimed in claim 12 wherein said phase reversing means and said enabling means comprises:

an inverter providing an output opposite in phase to the output of said variable frequency oscillator;

gate means controlling the conduction of output from said inverter to said counter or output from said variable frequency oscillator to said counter; and a flip-flop operated by output from said counter for enabling said gating means so that direct phase output and opposite phase output from said variable frequency oscillator is applied in alternation to said counter according to the output state of said flip-flop.

14. A digitally tuned superheterodyne receiver including a mixer and a local oscillator for converting the frequency of received signals to a constant intermediate frequency, comprising:

a frequency selector upon which the decimal representation of the frequency of the signal to be received may be set and providing a digitally coded output signal equivalent to the decimal setting thereof;

logic means for converting said digitally coded signal into band selection signals;

an element having an electrically variable reactance;

a plurality of elements having fixed reactances;

band selection means controlled by said band selection signals for connecting particular ones of said fixed reactance elements to said variable reactance element to provide resonant circuits tunable within a particular band of frequencies of the total tuning range of the receiver;

a second plurality of elements having fixed reactances;

means for selectively connecting at least one each of said second plurality elements to each of said resonant circuits so that variation of said variable reactance element from maximum to minimum reactance with none of said second plurality of elements connected tunes one of said resonant circuits through a segment of frequencies within a particular band and a similar variation of reactance with at least one of said second plurality of elements connected to one of said resonant circuits tunes said resonant circuit through a segment of frequencies contiguous to the first mentioned segment of frequencies; and second logic means responsive to said digitally coded output signal and to said band selection signals for controlling the connection of said second plurality of elements to said resonant circuits.

15. A receiver as claimed in claim 14 with additionally:

a frequency synthesizer serving as the local oscillator of said receiver, said synthesizer developing a voltage for controlling its own frequency; and means applying said synthesizer control voltage to said variable reactance elements to control the tuning of said resonant circuits.

16. A receiver as claimed in claim 15 wherein said frequency synthesizer comprises:

a standard oscillator;

a voltage controlled variable frequency oscillator;

a counter for counting output cycles of said variable frequency oscillator;

logic means responsive to said digitally coded signal for presetting said counter so that said counter will generate an output signal upon counting a number of cycles from said variable frequency oscillator equal to the frequency to be received offset by the intermediate frequency of the receiver and divided by the frequency of said standard oscillator; and means for comparing the phase of signals from said standard oscillator with output signals from said counter to provide control voltage for said variable frequency oscillator.

17. A receiver as claimed in claim 15 wherein said variable frequency oscillator signal is bipolar and said counter responds only to one polarity of said variable frequency oscillator signal, and with additionally;

means for selectively inverting the polarity of said variable frequency oscillator signal prior to application to said counter whereby the effective sum accumulated by said counter is increased by a fractional part of a cycle of said variable frequency oscillator signal.

18. A receiver as claimed in claim 17 wherein said means for selectively inverting polarity includes:

a flip-flop to which the output of said counter is applied;

means responsive to said digitally coded signal for enabling said flip-flop so that the output state of said flip-flop changes with each consecutive output signal from said counter;

an inverter to which output from said variable frequency oscillator is applied and which provides an output similar to said variable frequency oscillator output but of opposite polarity; and gate means responsive to the output state of said flip-flop for applying the output of said variable frequency counter to said counter without polarity inversion or with polarity inversion according to the output state of said flip-flop.

* * * * *